United States Patent [19]

Tucker

[11] Patent Number: 4,901,393
[45] Date of Patent: Feb. 20, 1990

[54] HAY AND STRAW CLEANING APPARATUS

[75] Inventor: Leslie R. Tucker, Nr Bridgwater, England

[73] Assignee: Sedgemoor Developments PLC, Chester, England

[21] Appl. No.: 138,418

[22] Filed: Dec. 28, 1987

[30] Foreign Application Priority Data

Nov. 10, 1987 [GB] United Kingdom ............... 8726256

[51] Int. Cl.⁴ ............................................. B08B 7/04
[52] U.S. Cl. ....................................... 15/308; 15/311; 56/16.4; 134/21
[58] Field of Search ..................... 15/301, 305, 306 B, 15/308, 310, 311; 56/16.4, 16.5; 134/21

[56] References Cited

U.S. PATENT DOCUMENTS

| | | | |
|---|---|---|---|
| 3,423,910 | 1/1969 | Shimamoto et al. | 56/16.5 |
| 3,884,028 | 5/1975 | Stahlecker et al. | 15/308 |
| 4,257,215 | 3/1981 | Maher et al. | 15/16.4 |
| 4,299,078 | 11/1981 | Werner | 56/16.4 |
| 4,496,105 | 1/1985 | Fleming et al. | 241/32 |
| 4,642,977 | 2/1987 | Ramacher | 56/16.5 |

Primary Examiner—Chris K. Moore
Attorney, Agent, or Firm—Neal J. Mosely

[57] ABSTRACT

An apparatus for cleaning hay and straw has a casing with a table and an inlet through which the hay and straw is fed. A set of tines (a rake) is positioned downstream from the inlet. A set of rotary tines is positioned to rotate through the rake to provide a combing and beating effect on the hay and straw fed thrugh the apparatus. Downstream of the tines is a chamber with a vacuum pump operatively connected to provide a suction through a perforate wall to remove spores and dust particles from the beaten and combed hay or straw. An outlet from the apparatus is located downstream from the vacuum chamber.

15 Claims, 7 Drawing Sheets

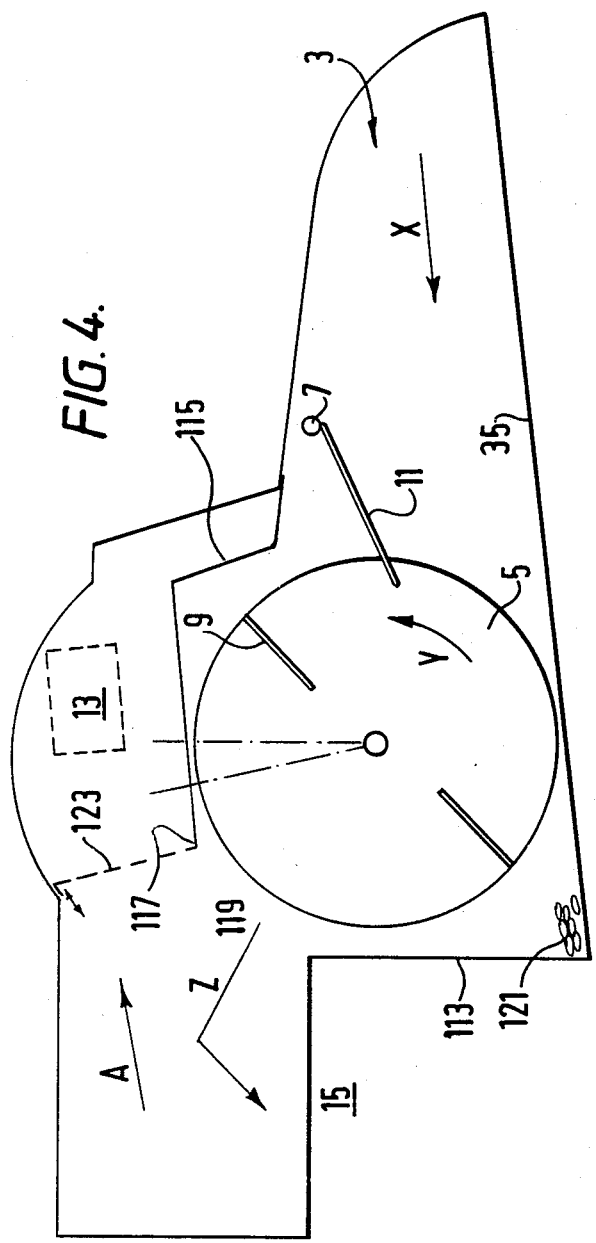

HAY AND STRAW CLEANING APPARATUS

FIELD OF THE INVENTION

The invention relates to an apparatus for cleaning hay and straw which is of particular use for cleaning the hay and straw to be used in stables.

It has only recently been recognized that hay and straw which has hitherto been regarded as "clean", contain many impurities which are a hazard to the health of both the horses or other animals to be stabled and the humans handling the hay and straw. It has been found that all bales of hay or straw purchased contain various levels of dust. Extensive recent research has discovered that the hay or straw contain a great diversity of contaminents to which horses and stable staff are exposed including fungal spores, bacteria, pollens, dust mites and other dust fragments. These can cause chronic pulmonary disease, respiratory hypersensitivity, systemic and local infections, abortions, feed toxicity and certain types of cancer. On top of this, whilst many of the particles in the environment may not themselves be pathogenic, they may affect the defense mechanism of the lung thereby reducing the horses or indeed the stables staff's resistance and making them more susceptible to other conditions such as viral infections. Exposure to these contaminents can also lead to hypersensitive pneumonitis (farmers-lung) in humans.

Recent surveys have shown that over 25% of all calls made to private veterinary surgeons, in respect of horses, have been concerned with some kind of respiratory condition. Clearly for all animals it is important to cut down any risk of such diseases for purely humane reasons. However, when the animals concerned are top racing horses the problem to be solved is of economic importance as well.

A number of different methods are adopted to try to clean the hay and straw. One old remedy is to pre-soak hay in cold water prior to feeding. However, this dampening effect, which may prevent some dust particles from escaping into the surrounding atmosphere, cannot prevent live and potentially harmful spores still within the sodden hay from entering the animal and causing various other problems. Recently there has been a move to use imported hays and pre-packed silage equivalent foods. These are expensive and inconvenient, and it has been shown that many of these alternative foods mould in the stable very quickly and this can greatly effect the nutritional status of the feeds. Apart from this, many of the alternative feeds also contain dusts.

SUMMARY OF THE INVENTION

According to the invention there is provided apparatus for cleaning hay and straw comprising; a casing including an inlet through which hay and straw may be fed into the casing; downstream of said inlet, beating and loosening means for receiving the hay and straw fed through the inlet and separating pieces of hay and straw to loosen spores therefrom; said beating and loosening means comprising, a drum rotatably mounted within the casing and including a plurality of tines which, in use, project radially outwards, a motor coupled to the drum operable to rotate it; and, a fixed rake bar mounted within the casing and including a plurality of tines, the relative positions of the drum and rake bar being such that the tines of the drum mesh with the tines of the rake bar so that hay and straw carried by the tines of the drum are passed also through the tines of the rake bar to provide a combing and beating effect on the hay and straw; downstream of said beating and loosening means, vacuum suction means, comprising, a subchamber mounted within said casing, the subchamber including at least one perforate wall lying between the subchamber and the hay and straw; and, a vacuum pump mounted within the subchamber to apply suction through the perforate wall to suck airborne spores and dust particles loosened from the hay and straw and extract them from the hay and straw, and, downstream of said vacuum suction means, outlet means in the casing for feeding hay and straw out of the apparatus.

In this way hay and straw is fed into the apparatus; beaten and combed to separate all the pieces of hay and straw and loosen all the spores and dust particles so that they become airborne. The airborne spores and dust particles are then extracted via the vacuum system to leave the hay and straw clean. This can remove up to 99.8% of the spores which considerably reduces any risk of health hazard from the hay or straw being output from the apparatus.

Preferably the rotating drum lies across the path that the hay and straw follows as it enters the apparatus. Preferably the direction of rotation of the drum is such that the drum contra-rotates with respect to the direction of feed of the hay and straw. In this way instead of the hay and straw being pulled under the rotating drum it is lifted and rotated over the drum. This helps to aerate the hay and straw and loosen all the strands and particles of the hay or straw.

In this case preferably the fixed rake bar is positioned such that the hay and straw carried by the rotating drum is pulled through the tines of the fixed rake bar as the hay and straw is being lifted by the rotating drum.

Preferably the drum is rotated at not less than 1400 RPM to ensure a smooth balanced tangle free operation. Clearly the rotation of the drum at such a high speed causes centrifugal force on the hay and straw which tends to throw the hay and straw away from the centre of the drum. Preferably, therefore the casing within which the rotating drum is mounted is shaped to form a guide to guide hay and straw through the apparatus. Thus, the wall of the casing is close to the rotating drum where it is desired that the hay and straw are kept within the tines and the casing then opens out to provide an outlet to allow the hay and straw to leave the drum at a desired position close to the outlet means.

Preferably the apparatus is arranged such that the hay and straw are fed into the apparatus manually and the passage of the hay and straw through the apparatus is effected merely by the rotation of the rotating drum.

Clearly in order to remove the airborne spores and dust particles by suction the perforate wall lying between the vacuum pump and the hay and straw must allow passage of airborne spores and dust particles but prevent passage of particles or strands of hay and straw. The perforate wall could be formed by a mesh plate. The perforate wall may surround the rotating drum forming a guide casing. It has been found however that the most efficient removal of dust particles and airborne spores takes place if the suction is only applied through a plate situated close to the point where the hay and straw are thrown radially outwards of the rotating drum since at this point all the strands and particles of hay and straw have been separated and loosened from each other. This is the most effective position for the removal of the dust and spores.

It has been found that a plate including only a small number of relatively perforations give the best possible filtering means. By relatively large is meant a diameter of between 4 and 8 centimeters. This allows for maximum passage of airborne spores and dust particles but prevents the strands of hay and straw being able to pass therethrough.

Preferably the rotating drum engages the hay and straw by its tines and rotates it upwards and over the top of the drum and allows the hay and straw to leave the tines at a position between 20° and 70° from the vertical. This means that the hay and straw is thrown upwards and away from the drum. Preferably, in this case, the perforate filter plate lies at an angle between 20° and 45° to the vertical at at a point above the rotating drum so that as the hay and straw moves away from the rotating drum the airborne spores and dust particles are sucked away.

Although it is possible for the tines on the rotating drum to be fixed, it is preferred that they can readily move out of position. This is because sticks, stones and other foreign objects are often mixed in with the hay and straw, and if they pass through the tines when they are fixed when the rotating drum is rotating at such a high speed, substantial damage would occur to the rotating drum.

Therefore, the tines may be spring-biased into position so that if they hit a foreign object they can move. However, it is preferred that the tines are mounted such that they are readily rotatable with respect to the drum. In a preferred embodiment the rotatable drum consists of a frame mounted for rotation about an axis, the frame including at least one tine mounting bar lying parallel but spaced apart from the axis of rotation, with the bar having a circular cross-section. The tines are mounted on or are connected to hollow sleeves having an internal circular cross-section of diameter large enough for the hollow sleeve to let the tine mounting bar pass through the hollow sleeve. The tines are all mounted on the bar via these sleeves and the hollow sleeves freely rotate about the bar. In this way, when the rotating drum frame rotates about the central axis, centrifugal force is applied to the tines mounted on the tine mounting bar and they are caused to splay outwards such that the tines extend radially outwards with respect to the central axis of rotation. However, if any foreign bodies come into contact with the tines this force applied to them will overcome the centrifugal force and allow the tines to move out of position. In this way, all foreign matter will gather beneath the rotating drum. Preferably the apparatus includes a debris removal outlet which allows for the collection and removal of any such foreign matter.

Preferably, the rotating drum frame has two tine mounting bars arranged diametrically opposed with respect to the axis of rotation. This gives efficient combing and separation of the hay and straw.

Preferably, the rotating drum assembly includes means for fixing the longitudinal position of each tine with respect to the frame without preventing free rotation of the tines with respect to the frame. Conveniently the gap between each pair of tines is between 5 and 15 centimeters, and more preferably the gap is 10 centimeters.

The tines on the rake bar do not have to be movable, they are fixed in position such that between each pair of tines mounted along the tine mounting bar, one tine of the rake bar will pass.

Conveniently the tines are of the type normally referred to as "Robin Hood" tines.

Preferably, the length of each tine is between 10 and 25 centimetres. Preferably, the distance between the rake bar and the rotating drum is such that the overlap between the tines of the rotating drum and the rake bar is between 4 and 10 centimeters. Preferably the depth is between 5 and 7.5 centimeters which provides an even combing and beating effect with minimal mechanical breakage of the hay and straw.

Preferably, the vacuum pump and the rotating drum can all be powered by a motor which is supplied by a conventional domestic power supply. In this way, the apparatus can be provided with, for example, a single 20 amp plug which can readily be plugged in to any convenient socket which allows for the apparatus to be used in many different situations. Preferably, the rotating drum is rotated by a motor which includes a control system which causes the motor to stop if too much hay and straw has been fed in at any one time. This prevents over-feeding of the apparatus and can prevent a lot of damage.

The apparatus may include means for storing the cleaned hay in sealed chambers so that the hay is delivered in an airtight container. Also, the apparatus may include a steaming facility for steaming the cleaned hay. The steam gives enhanced palatability to the finished hay. When horses try and eat too dry hay they can suffer from a problem known as "choke". The steam treatment of the hay can transform it into a grass like material which is easily digestible by horses.

However, the use of such steaming facilities means that the finished apparatus is large and unwieldy and has to be fixed in position in use.

In a preferred embodiment the apparatus is much smaller. In this preferred embodiment of the apparatus, apparatus for cleaning hay and straw comprising a chassis, four wheels mounted on said chassis to support said chassis, a drum rotatably mounted upon said chassis, a motor coupled to said rotating drum for rotating the drum, a plurality of tines mounted upon said drum such that in use they project radially from said drum, a fixed rake bar mounted upon said chassis including tines which project from said rake bar, the position of said rake bar and said rotating drum being such that the tines of the rake bar intermesh with the rotating tines of the drum; inlet means for feeding hay into the apparatus to feed it towards the rotating drum assembly, and vacuum pump means, mounted downstream of said rotating drum assembly for removing airborne spores loosened from the hay and straw; and outlet means for depositing cleaned hay and straw out of the apparatus.

In this preferred arrangement the hay is deposited on the floor and the apparatus is simply operated and light and easily manoeuvarable. In this way, the apparatus can be wheeled to a stable for use and then moved to another location when required.

BRIEF DESCRIPTION OF THE DRAWINGS

Apparatus for cleaning hay and straw in accordance with the invention will now be described, by way of example only, with reference to the accompanying drawings, in which:

FIG. 1 is a perspective view of the apparatus;

FIG. 2 is a side elevation of the apparatus;

FIG. 3 is a plan view of the apparatus;

FIG. 4 is a schematic section through the apparatus showing the position of the rotating drum and fixed rake bar;

DESCRIPTION OF THE PREFERRED EMBODIMENTS

Figure 6:
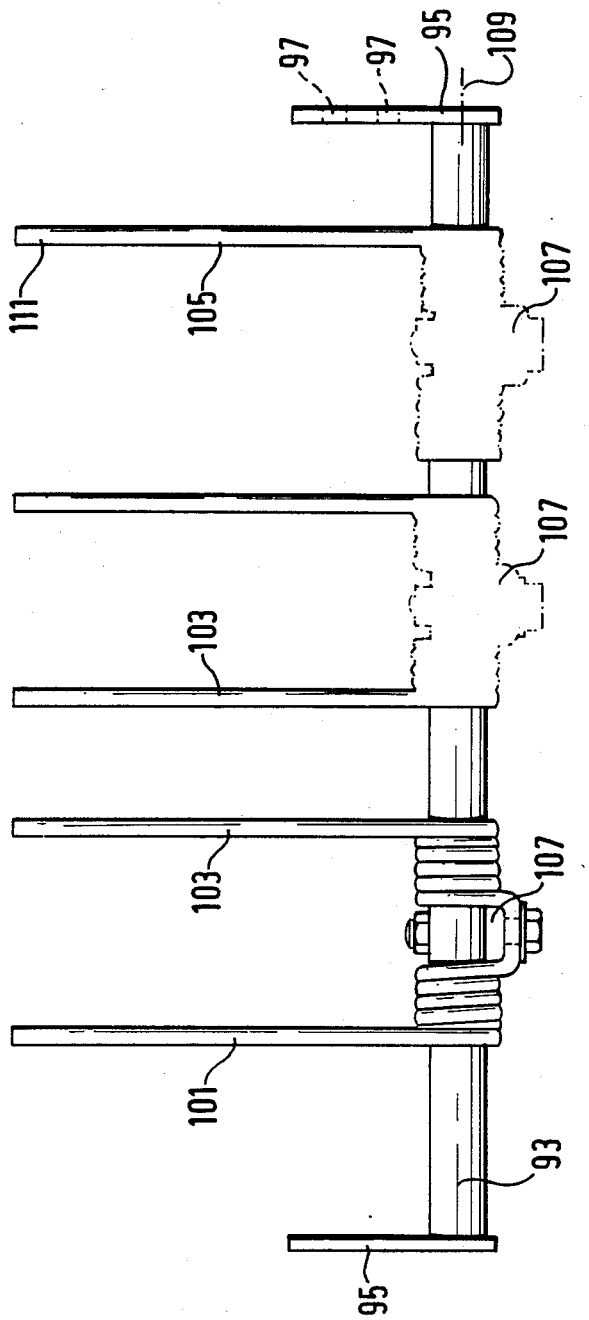
FIG. 6 is a schematic detailed view of the fixed rake bar.
Figure 7:
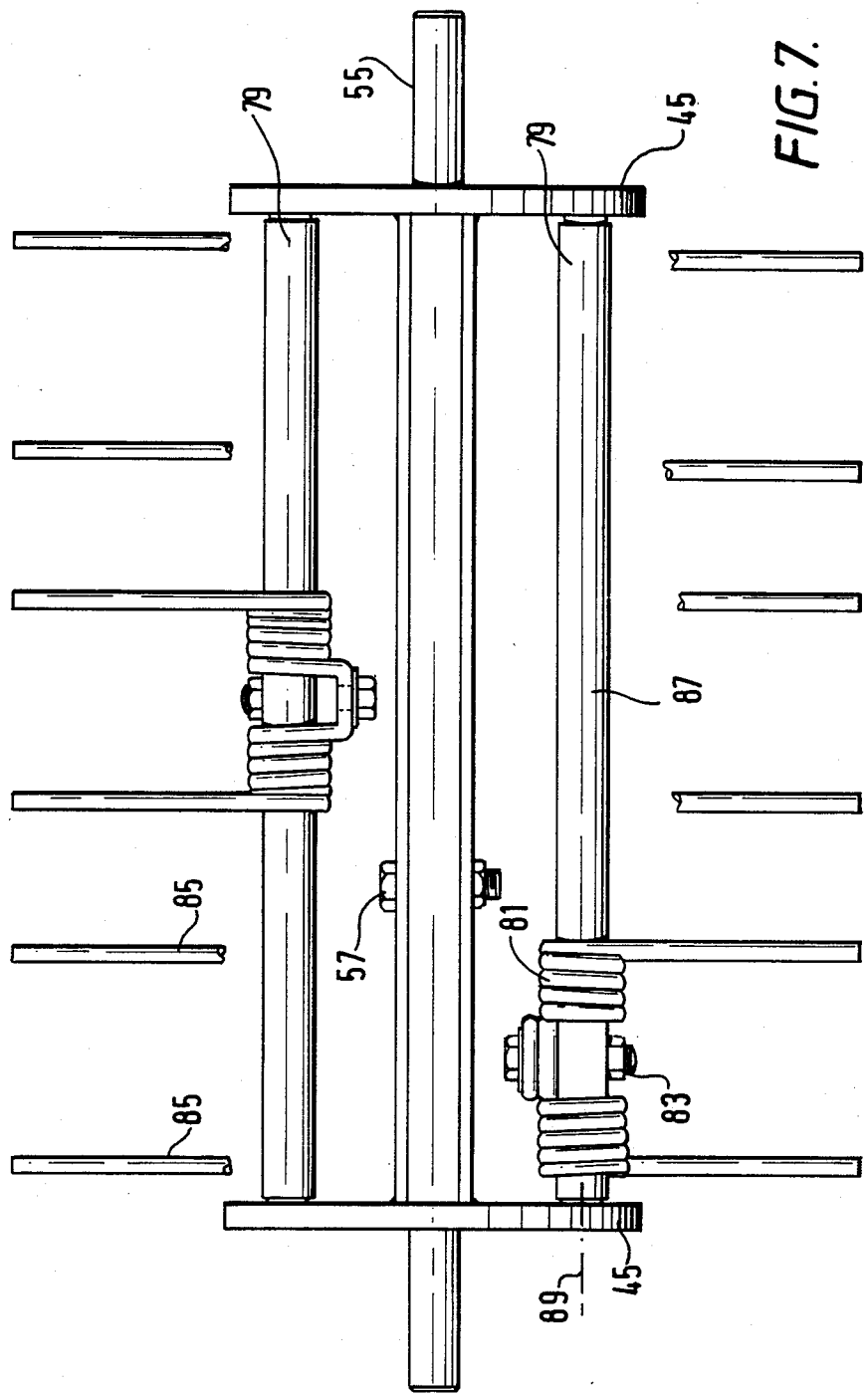
FIG. 7 is a schematic section through the rotating drum frame.
Figure 8:
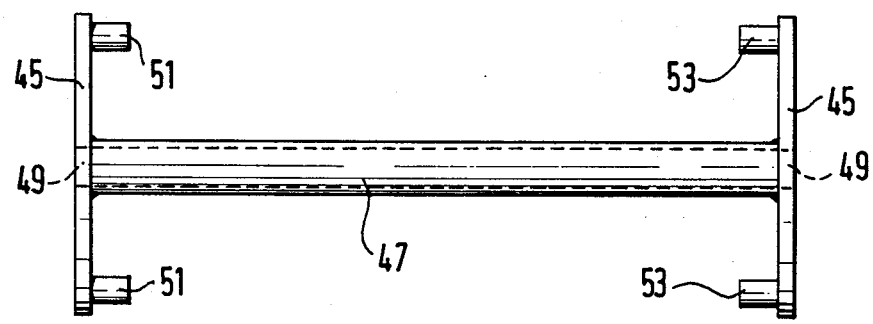
FIG. 8 is an elevation of the drum frame.
Figure 9:
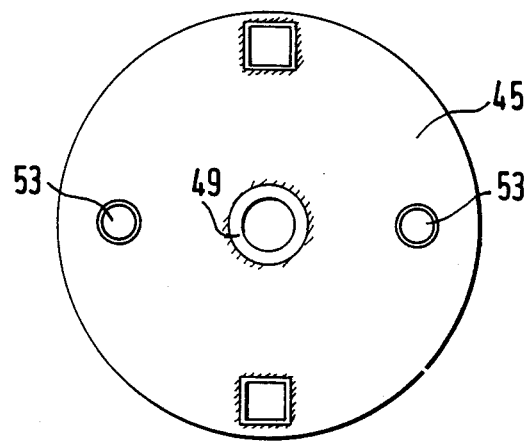
FIG. 9 is an end elevation of the rotating drum assembly.

Apparatus 1 is for cleaning hay and straw. It comprises an inlet 3 through which hay and straw can be fed and beating and loosening means 5 and 7 for separating pieces of hay and straw to loosen spores therefrom. The beating and loosening means comprises a rotating drum 5 having a plurality of tines 9 extending about its circumference and a fixed rake bar 7 including a plurality of tines 11 arranged to mesh with the rotating tines 9 of the rotating drum 5 to provide a combing and beating effect on the hay and straw. The apparatus also includes vacuum suction means indicated generally as reference 13 on FIG. 4 for sucking the airborne spores and dust particles loosened from the hay and straw to extract them from the hay and straw. The cleaned hay and straw is output via outlet means 15.

The apparatus 1 is housed on a chassis 17 mounted on four wheels 19. The chassis 17 consists of a mild steel framework body 21 to define a box shaped base 23 which has a longitudinal section which is a right angle trapezium as shown in FIG. 2. The walls of the box section are also mild steel. The front wall 25 and rear wall 27 are solid sheets but one side wall 29 shown in FIG. 1 includes a circular hole 31 the purpose of which will be further described in a further paragraph. The chassis 17 is mounted on four wheels 19 mounted at each corner of the chassis 17. A handle 33 which is of tubular construction is of mild steel and is mounted at the top of the base at the front of the apparatus. The total weight of the apparatus is approximately 120 kilograms which means that the apparatus is readily movable with the direction of movement controlled by the handle 33.

Above base 23 is mounted a feed table 35 along which the hay and straw is fed. Over this is mounted cover 37 made of glass reinforced plastics. At the top of the apparatus is a removable lid forming an inspection cover 39. Depending from the cover 37 at the outlet is a flexible PVC cover 41.

Mounted within cover 37 is rotating drum 5. The drum 5 consists of a drum frame 43 as shown in FIGS. 8 and 9. The drum frame 43 consists of two circular plates 45 including a central hollow tube 47 passing between the plates. Each plate 45 includes a bore 49. Mounted on one plate 45 is a pair of diametrically opposed dowels 51. Mounted on the opposite plate 45 is a further pair of diametrically opposed dowels 53. The dowels 51, 53 are of circular cross-section and are parallel to central tube 47. The dowels 51 are aligned to dowels 53 such that each pair of dowels 51 and 53 defines a tine mounting bar spaced from and parallel to central tube 47.

The frame 43 is mounted on a main shaft 55 which is passed through holes 49 and the centre of central tube 47. The drum frame is secured in position via a nut and bolt 57 which ensures that the drum frame rotates with the main shaft 55. The main shaft 55 is mounted between main shaft bearing 59 on one side of the cover 37 as shown in FIG. 2 and drive connection 61 shown schematically in FIG. 1. The shaft 55 passes through a bore 63 in the side wall of cover 37 and extends outwards to be engaged by a drive belt indicated schematically at 65 which is driven by engine shaft 67 which passes through the hole 31 in side 29 of the base. The engine shaft 67 is driven by the main drive motor 69 shown schematically in dotted line in FIGS. 1 and 2. The motor 69 consists of a 1.5 kilowatt motor which runs at 1430 RPM. This drives the engine shaft 67 which in turn drives the main shaft 55 via the drive belt 65. The drive belt 65 is protected by a drive belt cover 71.

The main motor 69 is coupled as shown in FIG. 2 to power feed cable gland 73 into which can be plugged a power supply. In this case, the apparatus can be operated by inserting a lead into power feed cable gland 73, the lead then being plugged into the domestic power supply. As can be seen in FIG. 2 the main motor 69 is also coupled to control console 75 and load gauge 77. The control console 75 includes buttons which can start and stop the operation of the main motor 69. The load gauge shows the load applied by the main motor 69 which indicates the through put of hay and straw through the apparatus. If too much hay and straw is fed into the apparatus then the main motor 69 has to work harder in order to rotate the rotating drum 5 and therefore the load gauge 77 registers a rise in load. The apparatus is arranged such that if the load exceeds a predetermined maximum (in this case 9.8 amps) the main motor 69 will automatically be stopped. This allows for the clearing of the apparatus and the prevention of damage due to jamming of the rotating drum 5.

The rotating drum frame 43 has radially projecting tines mounted upon it in the following manner. Mounted about each tine mounting bar 51 and 53 is rotatable sleeve 79. This has an internal cross-section which is circular and large enough to pass about the dowels 51 and 53. Onto each rotating sleeve 79 are mounted three pairs of Robin Hood tines 81. Each pair of Robin Hood tines 81 are bolted to rotating sleeve 79 by means of bolts 83 which bolts the tine in position on the rotating sleeve 79. It passes through the centre of the rotating sleeve 79 but clearly the sleeve 79 can rotate about tine mounting bar 53 since the dowels 51 and 53 do not project far into the sleeves 79.

The distance between two tines 85 in a pair is 100 centimeters and they are coupled to the rotating sleeve 79 by fixing 83 mounted at central position between the two tines 85. The tines are mounted on the rotating sleeve 79 such that the distance from the end plate 45 to the first central fixing position 83 is 65 millimeters. This applies at both ends of the drum frame 43. The distance between the first central position 83 and the central position 87 is 173 millimeters.

The length of each tine 85 i.e. the distance between the central axis 89 of rotating sleeve 79 and the end 91 of the tine is 135 millimeters. When the motor 69 operates to rotate the main shaft 55 the drum frame 43 also rotates typically at 1400 RPM. This high speed of rotation applies centrifugal force on the Robin Hood tines 81 which tends to throw them outwards so that the tines extend radially with respect to the central shaft 55. Since the distance between axis 89 and the central axis 55 is 27 centimeters, the maximum radius of the rotating drum 5 with the tines 81 extending radially is 40.5 centimeters. In use the rotating drum 5 rotates as shown in FIG. 4 in direction Y which in FIG. 4 is anti-clockwise. The fixed rake bar 7 is shown in detail in FIG. 6. The rake bar 7 consists of a bar 93 which extends between two fixing plates 95. Each plate 95 includes two spaced bores 97. These bores 97 are used in fixing the plates 95 to the side wall of the cover 37. Two fixing bolts 99 are passed through the side wall of the cover 37 and past the hole 97 of the fixing plate 95 to fix the rake bar 7 in a rigid position. The bar of the rake bar 93 has five tines 101 mounted upon it. These are in two pairs 103 and one single 105. The pairs 103 are standard Robin Hood tines. The single tine 105 is a Robin Hood tine with one tine removed. Each assembly 103 and 105 is locked into position on the bar 93 by locking bolts 107. As can be seen in FIG. 6 the tines 101 are positioned on the bar 93 in an uneven manner. The distance between the central fixing 107 of the single tine 105 and the closest fixing plate 95 is 130 millimeters. The distance between the central fixing 107 of the single tine 105 and the adjacent pair of tines is 105 millimeters. The distance between the central locking mechanisms 107 on the adjacent pair of tines are 165 millimeters and the distance between the fixing plate 95 and the locking mechanism 107 of the adjacent pair 103 is 150 millimeters. These distances are chosen so that when the rake bar 7 is fixed in position the tines 81 of the rotating drum assembly 5 mesh with the tines 101 of the rake bar 7. The length of the tine 101 i.e. the distance from the centre 109 of the bar 93 and the tip 111 of the tine is 215 millimeters.

The distance between the main shaft 55 and the mounting bar 93 of the fixed rake bar is 368 millimeters which means that the resultant interlock between the two sets of tines 81 and 101 is 5.75 centimeters.

The rotating drum 5 is housed within the casing the base of which is defined by feed table 35 and the back of which is defined by a removable back cover 113. The sides of the drum chamber are defined by the sides of the cover 37 and the top of the chamber is defined by an internal ceiling 115. The internal ceiling 115 extends from the top of the front of the cover 37 and divides the space therein to define an upper area where the vacuum suction means 13 is housed. The internal ceiling 115 is shaped and positioned so as to help to guide passage of the hay and straw through the apparatus.

The hay and straw is fed into the apparatus in direction X manually through the input 3. The hay and straw is pushed forwards until it is engaged by the tines 81 of the rotating drum 5. The rotating drum 5 engages the hay and straw and lifts it upwards in direction Y where it then meshes with the rake tines 101. The hay and straw is then combed and beaten and in this loosened state it is lifted upwards by the tines of the rotating drum 5. The centrifugal force applied on the hay and straw tends to throw the hay and straw outwards in a radial direction away from the drum. Thus, the internal ceiling 115 is positioned close to the drum 5 over the top of the drum 5 to ensure that the hay and straw does not leave the drum 5 at that position. The internal ceiling 115 terminates at a point 117 which is at a position about 20° from the vertical so that the hay is moved over the vertical with the drum and then thrown upwards and away from the drum in direction Z through the opening 119 defined between point 117 and rear wall 113. The hay and straw is thrown upwards in a loosened state and then falls downwards by gravity out of the outlet 15 through the flexible cover 41 and then falls to a storage box or on the ground positioned appropriately beneath the rear of the apparatus. There are many occasions when the hay and straw includes many foreign bodies such as sticks and stones which could potentially damage the tines 101 and 81 if there were no means for removing them. The tines 81, if they come into contact with any stones or any resistance, will move out of their radial position to allow the debris to fall to the feed table 35 and progress to the rear wall 113. The rear wall cover 113 is removable to allow the debris shown schematically 121 to be removed.

Figure 1:
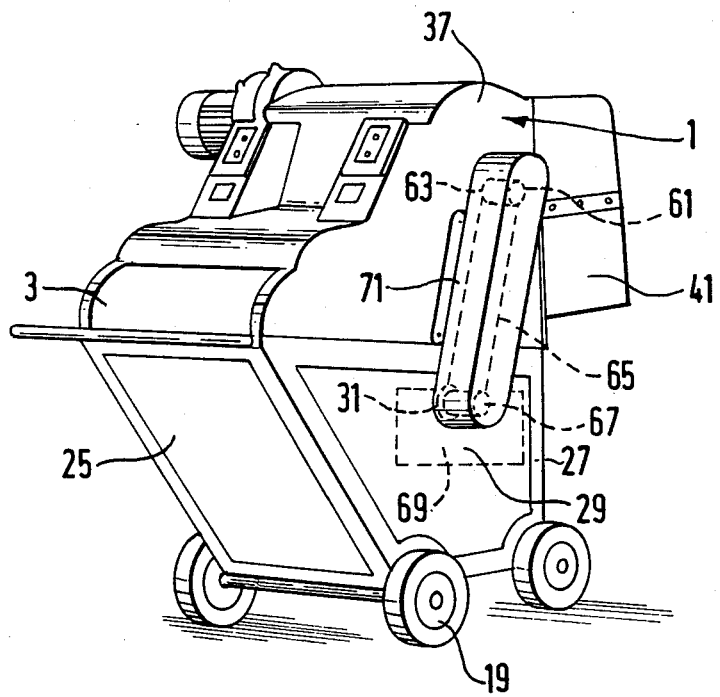
Figure 5:
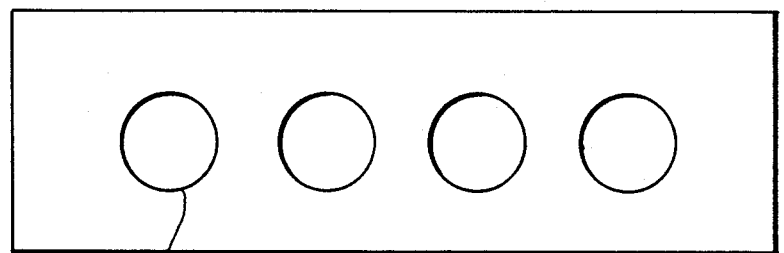
FIG. 5 is a sectioned elevation taken in direction A of FIG. 4.
Figure 2:
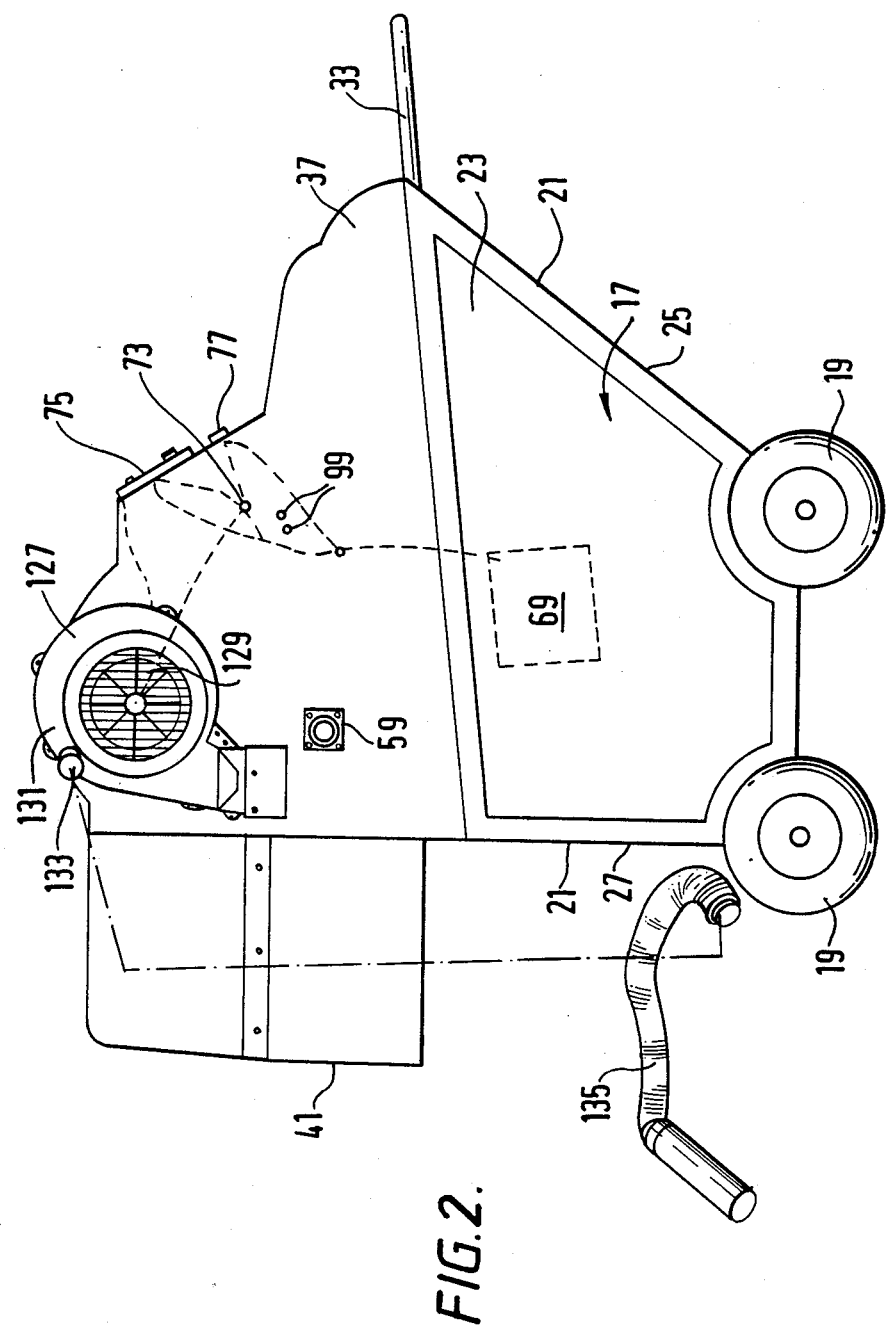
Figure 3:
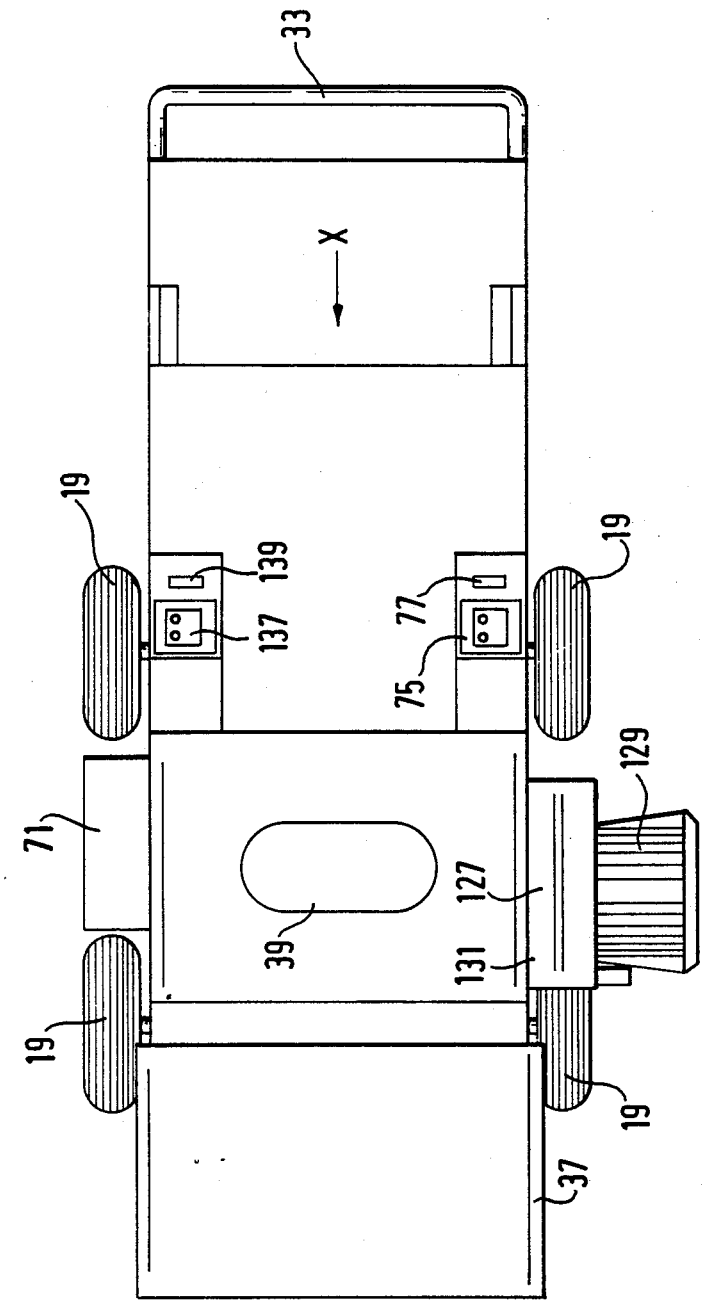

It has been found that the most effective position for removing the dust particles and airborne spores from the hay and straw is as the hay and straw is thrown upwards and outwards at Z. For this reason at filter plate 123 is positioned extending upwards from termination point 117 at an angle to the vertical. The shape of the plate 123 is shown in more detail in FIG. 5. Instead of there being either a mesh plate or a plate perforated with many holes it has been found that a plate including four perforations 125 with a diameter of 60 millimeters will give maximum through-put of air including spores and dust particles without allowing for hay and straw to be lost through this system. The vacuum suction means 13 comprises a motor 127 which consists of a flange mounted 2800 RPM, 240 volts, 25 kilowatt motor. In this case, the motor was sold by GEC. It drives a single inlet centrifugal fan 129 which in this case is a model VBW7 such as that sold by Air Control Installation, Chard Limited of Chard, Somerset, England. The vacuum suction means also includes an overload relay 131 which ensures that the fan 129 and motor 127 do not overload. Thus, particles and air spores are sucked in through the plate 123 and then are output via outlet means 133 into which may be fitted a dust tube 135 which removes the dust. The dust is preferably fed into an environment with water to ensure that the dust does not enter the air. The motor 127 is coupled to the power feed cable gland 77 and is also coupled to a control console 137 and an overload gauge 139 which are used to control the operation of the vacuum suction means 13 and monitor the load.

The speed of operation of the apparatus is such that one bale of hay of approximately 3 feet long and 18 inches wide will take 2 to 3 minutes to be processed by the apparatus. The apparatus can remove up to 99.8% of all dust and spores within a bale of hay.

I claim:

1. An apparatus for cleaning hay and straw comprising
    a housing having a feeding tray and an inlet for receiving hay and straw at one end and outlet for discharging hay and straw at the other end,
    beating and loosening means, positioned in said housing between said inlet and said outlet, for separating hay and straw from fine particular matter, comprising a fixed rake bar with a plurality of tines, a plurality of rotary tines supported for rotation through said rake bar tines, and a motor operatively connected to said rotary tines for rotating the same to provide a combing and beating action on said hay and straw and to convey the same through the apparatus,
    said housing having a perforate wall opening located between said beating and loosening means and said outlet, and
    vacuum suction means operatively connected to the outside of said perforate wall opening to separate particulate matter from the beaten and combed hay and straw passing through the apparatus.

2. An apparatus according to claim 1 in which said rotary tines comprise a rotary drum with radially extending tines supported thereon.

3. An apparatus according to claim 2 in which said drum is mounted within said housing across the path of introduction of hay and straw through said inlet and said motor rotates said rotary tines to lift said hay and straw and pull the same through the tines of said fixed rake bar.

4. An apparatus according to claim 2 in which the portion of said housing in which said rotary drum is positioned is sized and shaped to guide the hay and straw through said apparatus.

5. An apparatus according to claim 2 in which said housing has a portion adjacent said beating and loosening means into which said hay and straw is discharged, and said perforate wall opening is located adjacent to said last named housing portion.

6. An apparatus according to claim 2 in which said housing has a portion adjacent said beating and loosening means defining a region located 20°-70° from the vertical into which said hay and straw is discharged, and said perforate wall opening is located adjacent to said last named housing portion at a point above said rotating drum and at an angle of 20°-45° to the vertical so that the hay and straw moves away from the rotating drum as the particulate matter is sucked away.

7. An apparatus according to claim 2 in which said drum comprises a frame mounted for rotation about an axis and including at least one mounting bar supported parallel to and spaced from said axis, said tines being supported for angular movement on said mounting bar and extend radially outward by centrifigal force during rotary movement of said drum.

8. An apparatus according to claim 7 in which said drum has a plurality of said tine mounting bars.

9. An apparatus according to claim 1 in which said housing includes a subchamber mounted exterior to said perforate wall opening, and said vacuum suction means comprises a vacuum pump positioned to apply suction to said subchamber.

10. An apparatus according to claim 1 in which said rotary tines comprise a rotary drum with radially extending tines supported thereon, said housing includes a subchamber mounted exterior to said perforate wall opening, and said vacuum suction means comprises a vacuum pump positioned to apply suction to said subchamber.

11. An apparatus according to claim in which said perforate wall opening has 3-5 openings which are 4-8 centimeters in diameter.

12. An apparatus according to claim 1 including means positioned at said outlet for storing cleaned hay and straw in sealed chambers.

13. An apparatus according to claim 12 including means positioned between said perforated opening and said outlet for steaming the cleaned hay and straw.

14. An apparatus according to claim 1 in which said housing comprises a wheeled chassis, said rotary tines comprise a rotary drum with radially extending tines supported thereon, said tines being supported for angular movement on said drum and extend radially outward by centrifigal force during rotary movement of said drum, said housing includes a subchamber mounted exterior to said perforate wall opening, and said vacuum suction means comprises a vacuum pump positioned to apply suction to said subchamber.

15. A method of cleaning hay and straw which comprises
feeding hay and straw into the inlet of an apparatus as defined in claim 1,
rotating said rotary tines through said rake bar tines to comb and loosen said hay and straw,
operating said vacuum suction means to remove particulate matter through said perforate opening, and
removing the cleaned and combed and vacuumed hay and straw from the outlet of said apparatus.

* * * * *